US011539517B2

(12) United States Patent
Barnes, II et al.

(10) Patent No.: US 11,539,517 B2
(45) Date of Patent: Dec. 27, 2022

(54) PRIVATE ASSOCIATION OF CUSTOMER INFORMATION ACROSS SUBSCRIBERS

(71) Applicant: Cisco Technology, Inc., San Jose, CA (US)

(72) Inventors: Richard Lee Barnes, II, Arlington, VA (US); Michael P. Lepore, Marlborough, MA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 413 days.

(21) Appl. No.: 16/564,741

(22) Filed: Sep. 9, 2019

(65) Prior Publication Data

US 2021/0075605 A1    Mar. 11, 2021

(51) Int. Cl.
  *H04L 9/08* (2006.01)
  *G06Q 30/00* (2012.01)
  *G06F 16/953* (2019.01)

(52) U.S. Cl.
  CPC .......... *H04L 9/0869* (2013.01); *G06F 16/953* (2019.01); *G06Q 30/01* (2013.01); *H04L 9/0894* (2013.01); *H04L 2209/50* (2013.01)

(58) Field of Classification Search
  CPC . H04L 9/0869; H04L 9/0894; H04L 2209/50; H04L 2209/42; G06Q 30/01; G06F 16/953
  See application file for complete search history.

(56) References Cited

U.S. PATENT DOCUMENTS

| 7,930,252 | B2 | 4/2011 | Bender et al. |
| 8,140,502 | B2 | 3/2012 | Francis et al. |
| 8,838,629 | B2 | 9/2014 | Degeoglu et al. |
| 9,002,018 | B2 | 4/2015 | Wilkins et al. |
| 9,015,480 | B2 | 4/2015 | Orsini et al. |
| 9,210,623 | B2 * | 12/2015 | Pang ................. H04W 36/0033 |
| 9,361,481 | B2 | 6/2016 | LaFever et al. |

(Continued)

FOREIGN PATENT DOCUMENTS

WO    2017/161403    9/2017

OTHER PUBLICATIONS

Nabeel et al., Privacy Preserving Context Aware Publish Subscribe Systems, Springer, 2013.*

(Continued)

*Primary Examiner* — David Garcia Cervetti
(74) *Attorney, Agent, or Firm* — Edell, Shapiro & Finnan, LLC

(57) ABSTRACT

Methods are provided for discovering related attributes with respect to an element in a customer data record, based on provided associations and for generating new associations between various elements of the customer data record. In these method, the context service system obtains, from a subscriber, a lookup request including a first blinded attribute. The first blinded attribute is obtained by applying an oblivious pseudo random function (OPRF) to a first element of a data record. The method further includes the context service system identifying at least one second blinded attribute associated with the first blinded attribute in a shared data partition of the context service system and providing, to the subscriber, at least one second element of the data record associated with the at least one second blinded attribute.

20 Claims, 8 Drawing Sheets

(56) References Cited

U.S. PATENT DOCUMENTS

| | | | |
|---|---|---|---|
| 9,565,020 B1* | 2/2017 | Camenisch | H04L 9/0863 |
| 9,584,320 B1* | 2/2017 | Parkinson | H04L 9/3066 |
| 9,699,146 B1 | 7/2017 | Kinney, III et al. | |
| 9,712,320 B1* | 7/2017 | Kiayias | H04L 9/0662 |
| 10,235,335 B1* | 3/2019 | Speers | G06F 16/2425 |
| 10,635,824 B1* | 4/2020 | Triandopoulos | G06F 21/602 |
| 2003/0182394 A1* | 9/2003 | Ryngler | H04W 4/029 |
| | | | 709/217 |
| 2005/0066174 A1* | 3/2005 | Perlman | H04L 9/3006 |
| | | | 713/176 |
| 2005/0066175 A1* | 3/2005 | Perlman | H04L 9/302 |
| | | | 713/176 |
| 2006/0085651 A1* | 4/2006 | Staddon | G06F 21/6227 |
| | | | 713/193 |
| 2007/0214495 A1* | 9/2007 | Royer | G06F 21/41 |
| | | | 707/999.103 |
| 2012/0167189 A1* | 6/2012 | Aichroth | H04L 9/3218 |
| | | | 726/7 |
| 2012/0254605 A1* | 10/2012 | Sun | G09C 1/00 |
| | | | 713/150 |
| 2013/0173917 A1* | 7/2013 | Clifton | G06F 16/334 |
| | | | 713/167 |
| 2014/0177828 A1* | 6/2014 | Loftus | H04L 9/0852 |
| | | | 380/44 |
| 2014/0349682 A1* | 11/2014 | Nawaz | H04W 12/30 |
| | | | 455/456.3 |
| 2015/0161398 A1* | 6/2015 | De Cristofaro | G06Q 10/10 |
| | | | 726/26 |
| 2015/0270966 A1* | 9/2015 | Joye | H04L 9/3093 |
| | | | 380/30 |
| 2015/0295716 A1* | 10/2015 | Liu | H04L 9/008 |
| | | | 713/191 |
| 2015/0312028 A1* | 10/2015 | Cheon | H04L 9/008 |
| | | | 713/189 |
| 2015/0365239 A1* | 12/2015 | Gajek | H04L 9/008 |
| | | | 380/282 |
| 2015/0372811 A1* | 12/2015 | Le Saint | G06Q 20/3227 |
| | | | 705/76 |
| 2016/0065370 A1* | 3/2016 | Le Saint | H04L 9/14 |
| | | | 713/155 |
| 2016/0080347 A1* | 3/2016 | Rappaport | H04L 51/52 |
| | | | 726/5 |
| 2016/0218875 A1* | 7/2016 | Le Saint | H04L 9/0825 |
| 2016/0364582 A1* | 12/2016 | Cammarota | H04L 9/008 |
| 2017/0070340 A1* | 3/2017 | Hibshoosh | H04L 9/3026 |
| 2017/0134156 A1* | 5/2017 | Laine | H04L 9/008 |
| 2017/0134158 A1* | 5/2017 | Pasol | H04L 9/3066 |
| 2017/0147808 A1 | 5/2017 | Kravitz | |
| 2017/0177683 A1* | 6/2017 | Koike | G06F 21/6254 |
| 2017/0180115 A1* | 6/2017 | Laine | H04L 9/0618 |
| 2017/0222801 A1* | 8/2017 | Le Saint | H04L 9/14 |
| 2017/0237555 A1 | 8/2017 | Roullier et al. | |
| 2017/0250972 A1* | 8/2017 | Ronda | H04L 63/0428 |
| 2017/0346625 A1* | 11/2017 | Yan | G06F 21/602 |
| 2017/0357749 A1* | 12/2017 | Laine | G16B 50/40 |
| 2017/0357826 A1* | 12/2017 | Gouget | G06F 21/6254 |
| 2018/0025167 A1* | 1/2018 | Bohli | H04L 63/0281 |
| | | | 713/193 |
| 2018/0115535 A1 | 4/2018 | Mehta | |
| 2018/0165460 A1* | 6/2018 | Tueno | H04L 9/06 |
| 2018/0260576 A1* | 9/2018 | Miguel | H04L 9/008 |
| 2018/0337788 A1* | 11/2018 | Gajek | H04L 9/008 |
| 2018/0343109 A1* | 11/2018 | Koseki | H04L 9/3247 |
| 2018/0375639 A1* | 12/2018 | Lauter | H04L 9/008 |
| 2018/0375652 A1* | 12/2018 | Karame | H04L 9/0877 |
| 2019/0050589 A1* | 2/2019 | Rane | G06F 16/254 |
| 2019/0058709 A1 | 2/2019 | Kempf et al. | |
| 2019/0140818 A1* | 5/2019 | Bent | H04L 9/3093 |
| 2019/0182027 A1* | 6/2019 | Kipnis | H04L 9/14 |
| 2019/0190694 A1* | 6/2019 | Joye | H04L 9/14 |
| 2019/0296896 A1* | 9/2019 | Resch | H04L 9/008 |
| 2019/0296897 A1* | 9/2019 | Resch | H04L 9/0897 |
| 2019/0297064 A1* | 9/2019 | Resch | H04L 9/3271 |
| 2019/0334708 A1* | 10/2019 | Carpov | H04L 9/008 |
| 2019/0342270 A1* | 11/2019 | Laine | G06F 21/602 |
| 2019/0349191 A1* | 11/2019 | Soriente | H04L 9/0844 |
| 2019/0356475 A1* | 11/2019 | Resch | H04L 9/085 |
| 2019/0378599 A1* | 12/2019 | Amisano | G06F 16/951 |
| 2020/0067699 A1* | 2/2020 | Resch | G09C 1/00 |
| 2020/0067707 A1* | 2/2020 | Resch | H04L 9/0841 |
| 2020/0092094 A1* | 3/2020 | Resch | H04L 9/0877 |
| 2020/0244435 A1* | 7/2020 | Shpurov | H04L 9/3239 |
| 2020/0244437 A1* | 7/2020 | Ruan | G06K 9/6256 |
| 2020/0382287 A1* | 12/2020 | Camenisch | H04L 9/0825 |
| 2020/0394518 A1* | 12/2020 | Sirdey | G06N 3/0454 |
| 2020/0401726 A1* | 12/2020 | Lim | H04L 9/0643 |
| 2020/0402073 A1* | 12/2020 | Tang | H04L 63/04 |
| 2020/0404023 A1* | 12/2020 | Zhu | H04L 9/3073 |
| 2021/0144130 A1* | 5/2021 | Brun | H04W 12/35 |
| 2021/0243026 A1* | 8/2021 | Mohassel | H04L 9/3236 |
| 2022/0060897 A1* | 2/2022 | Bartolomé Rodrigo | |
| | | | H04W 12/06 |

OTHER PUBLICATIONS

Onica et al., Privacy Preserving Context Aware Publish Subscribe Systems, ACM, 2016.*
Partha Pal et al., Privacy Preserving Context Aware Publish Subscribe Systems, Middleware LNCS, 2012.*
Kolesnikov, Vladimir et al., "Efficient Batched Oblivious PRF with Applications to Private Set Intersection", https://dl.acm.org/citation.cfm?id=2978381, Oct. 24-28, 2016, 12 pages.
Sullivan, N. et al., "Verifiable Oblivious Pseudorandom Functions (VOPRFs)", draft-sullivan-cfrg-voprf-00, Mar. 5, 2018, 16 pages.
Jarecki, Stanislaw, "Efficient Oblivious Pseudorandom Function with Applications to Adaptive OT and Secure Computation of Set Intersection", Mar. 2009, 19 pages.
Wikipedia, "Pseudorandom function family", https://en.wikipedia.org/wiki/Pseudorandom_function_family#cite_note-1, Jun. 27, 2019, 3 pages.
Wikipedia, "scrypt", https://en.wikipedia.org/wiki/Scrypt, May 31, 2019, 5 pages.

* cited by examiner

PRIVATE ASSOCIATION OF CUSTOMER INFORMATION ACROSS SUBSCRIBERS

TECHNICAL FIELD

The present disclosure relates to computerized management of customer information including identifying associations between customer information.

BACKGROUND

More and more services are becoming available to customers. To provide these services, businesses and organizations store customer information or data in computing environments such as datacenters. Since different services use different customer information, the customer information is segmented depending on a particular service. For example, a call center platform may store customer's name, telephone number, and shipping address, whereas an electronic commerce platform may store customer's name, email address, account name, and password. Other platforms may include other customer information such as user profile and customer preferences in a social media platform, customer's billing information including customer's financial information in a financial platform, and so on. Business and organizations spend time and effort in managing customer information to provide satisfactory customer service and to customize customer service according to various needs and preferences of their customers.

DESCRIPTION OF EXAMPLE EMBODIMENTS

Overview

Figure 1:
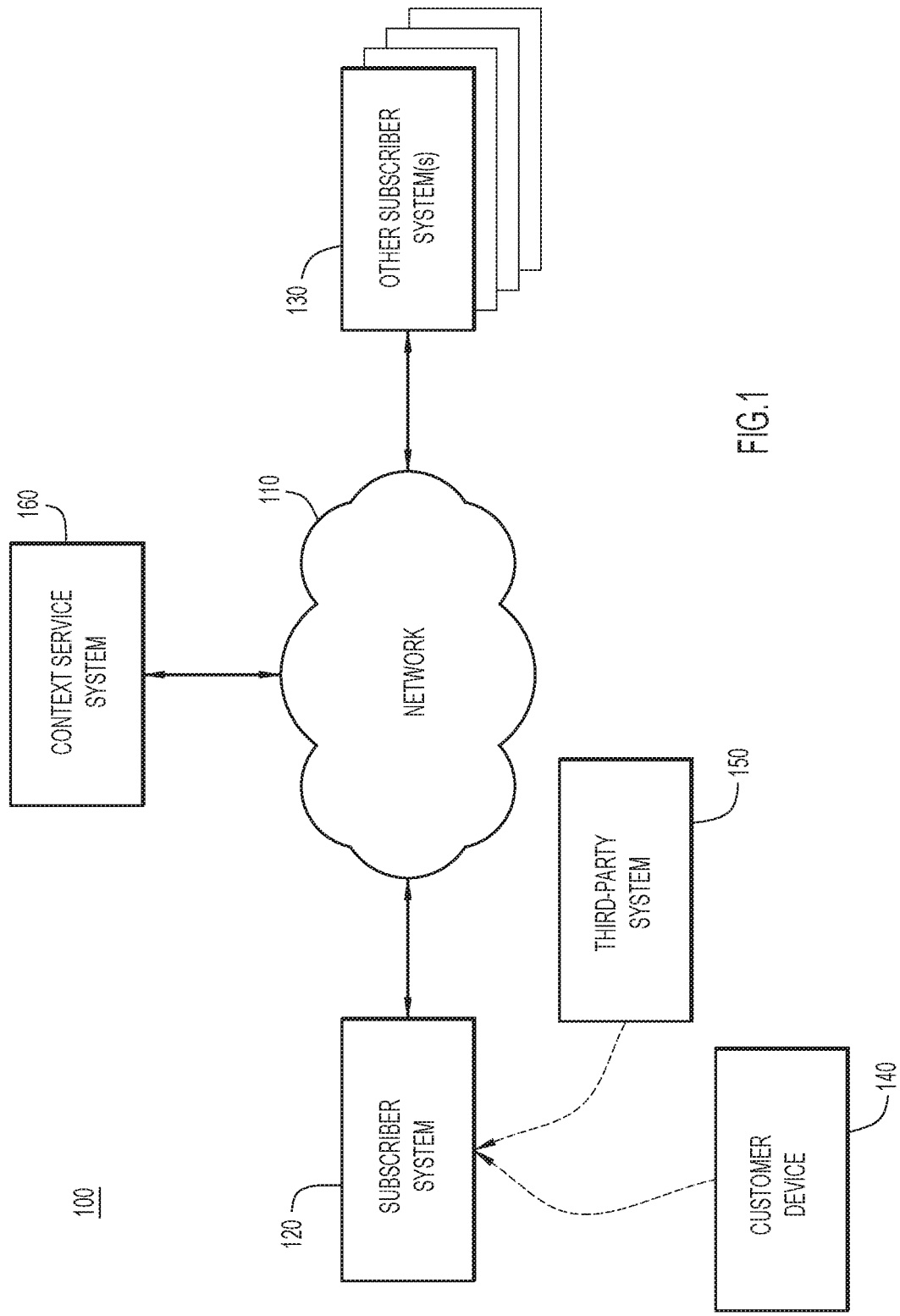
FIG. 1 is a block diagram illustrating a context service architecture that has a context service system, according to an example embodiment.

In one example embodiment, a method is provided in which a context service system obtains, from a subscriber, a lookup request including a first blinded attribute. The first blinded attribute is obtained by applying an oblivious pseudo random function (OPRF) to a first element of a data record. The method further includes identifying, by the context service system, at least one second blinded attribute associated with the first blinded attribute in a shared data partition of the context service system. The method further includes providing, by the context service system to the subscriber, at least one second element of the data record associated with the at least one second blinded attribute.

In another example embodiment, a method is provided in which a context service system obtains, from a subscriber, a request including at least one element of a data record. The method further includes generating, by the context service system, a response by applying an oblivious pseudo random function (OPRF) to the at least one element and providing, by the context service system to the subscriber, the response. The response is applied by the subscriber to compute at least one blinded attribute corresponding to the at least one element and sharable with other subscribers to obtain an association between the at least one element and at least one other element of the data record.

EXAMPLE EMBODIMENTS

Customer information is often fragmented based on various service platforms. A particular service platform may have incomplete customer information. For example, an electronic commerce platform may receive a call from a customer from a telephone number. Since the electronic commerce platform did not store the telephone number for the customer, it is unable to associate the telephone number to the customer's record which includes the customer's name and email information, for example. That is, even though the electronic commerce platform has access to the telephone number and other customer information, the electronic commerce platform is unable to leverage the customer information because the customer information is fragmented and there is no association between the telephone number and the rest of the customer information.

Context is important to provide a personalized experience to a customer. In an example provided above, the electronic commerce platform needs to identify who the caller is and why he or she is calling. Being able to identify the customer is the first step that is involved, and is usually based on observable customer attributes such as "This call is from 555-123-4567, so it must be Fred Smith". According to an example embodiment, a tenant of a common solution provider allows for multiple customer service organizations to discover when another tenant has associated an attribute with other attributes. In other words, in an example embodiment, associations between various customer attributes can be learned based on information discovered by other service platforms.

Additionally, in example embodiments, the associations are observed without sharing the actual customer attributes. That is, while organizations or various service platforms may be tempted to share and exchange customer information with each other or through partnerships or through third-party data brokers, this can be illegal or undesirable in the interest of customer relations. For example, the information collected may include personally identifiable information (PII) or other private information that legally cannot be shared without the consent of the customer e.g., billing information, address, etc. Also, an organization may not always want to share collected information for various other business reasons. For example, the collected customer information may be a valuable resource that may serve as a competitive advantage over other businesses or organizations. As such, the organization may be willing to only share an association of customer attributes without revealing the actual values.

In one or more example embodiments, a context service system is configured to leverage the customer information shared across multiple subscribers and allow subscribers to share associations between different elements of customer information without exposing the customer information. As will be discussed in further detail below, the context service system generates a shared data partition that contains associations of different elements of customer information provided by various subscribers or a subscriber group. The shared data partition has blinded attributes stored in a customer record that represent customer attributes. The context service system facilitates the querying of the shared data partition by a subscriber to determine whether a first element of customer information provided by the subscriber is associated with another element of customer information that is already known to the subscriber without sharing the actual information, as explained in further detail below. Many subscribers submit blinded attributes associated with customers, which the context service aggregates in the shared partition. Any given subscriber queries with a blinded attribute representing a real attribute they have seen. The context service queries the shared partition for any related blinded attributes, then provides the subscriber with any associated unblinded attributes held in the subscriber partition, as detailed below.

In an example embodiment, the shared data partition stores different elements of customer information in their blinded forms. In one or more example embodiments, the blinded forms are obtained by applying an Oblivious Pseudo-Random Function (OPRF). In one or more other example embodiments, the blinded forms are obtained by applying a Verifiable OPRF (VOPRF). The OPRF and VOPRF are cryptographic protocols that are used to blind different elements of customer information so that only blinded elements are stored in the shared data partition.

In the OPRF and VOPRF protocols, a client and a server hold an asymmetric key pair (k, k*G) such that at the termination of the protocol: (1) the client learns F(k, x), where "F" is a pseudo-random function and "x" is a value provided by the client, (2) the client can verify that the value it has learned is the correct value of F for the inputs "k" and "x", and (3) the client does not obtain any information about the private key "k" and the server does not obtain any information about the client's value "x". Accordingly, these different elements of customer information become blinded attributes because their actual values cannot be learned outside of a particular subscriber. The process of blinding one or more different elements of the customer information is explained in greater detail below, according to various example embodiments.

FIG. 1 is a block diagram illustrating a context service architecture 100 which has a context service system, according to an example embodiment. The context service architecture 100 includes a subscriber system 120, other subscriber systems 130, a customer device 140, a third-party system 150, and a context service system 160. One of ordinary skill in the art would readily appreciate that this context service architecture 100 is provided by way of an example and not by way of a limitation. Example embodiments are applicable to other context service architectures depending on a particular configuration environment. For example, third-party system 150 or customer device 140 may be omitted.

The subscriber system 120 and other subscriber systems 130 are configured to communicate with the context service system 160 via a network 110. The network 110 may include, for example, any one or more of a cellular network, a satellite network, a personal area network (PAN), a local area network (LAN), a wide area network (WAN), a broadband network (BBN), the Internet, and the like. The network 110 can be a public network, a private network, or a combination thereof. The network 110 may be implemented using any number of communications links associated with one or more service providers, including one or more wired communication links, one or more wireless communication links, or any combination thereof. Additionally, the network 110 can be configured to support the transmission of data formatted using any number of protocols.

The subscriber system 120 and/or subscriber systems 130 may be associated with a financial services entity, a medical industry entity, a business entity, an e-commerce entity, or any other entity that deals with customer information, account information, user information, or profile information. The subscriber system 120 and/or subscriber systems 130 may also be associated with a particular function or purpose such as a call center, a contact center, a sales organization or group, a customer service center, a help desk, or other group that may deal with customer information, account information, user information, and/or profile information. The subscriber system 120 and/or subscriber systems 130 may each manage a separate database of customer information.

According to one or more example embodiments, the subscriber system 120 may obtain an element of customer information such as a telephone number, email address, mailing address, user name, or some other customer identifier. The element of customer information may be generated by the subscriber system or received via an external party such as the customer device 140 or the third-party system 150. For example, the third-party system 150 may be configured to perform a task with the subscriber system 120 via an application programming interface (API) provided by the subscriber system 120 and the third-party system 150 may provide the subscriber system 120 with an element of customer information for a user, account, or other entity during the course of performing that task.

In another example, the customer device 140 may communicate with the subscriber system 120 and provide, either directly or indirectly (e.g., via the communication protocols used), the element of customer information. The communications may occur via, for example, a cellular network, a landline telephone network, an short message service network, a chat or messaging service, or any number of other communication technologies.

The context service system 160 enables the subscriber system 120 to determine whether the element of customer information is associated with other information that is already in the subscriber system's database of customer information by leveraging customer information associated with the other subscriber systems 130 without revealing any of the customer information associated with the other subscriber systems 130, as explained in further detail below.

Figure 2:
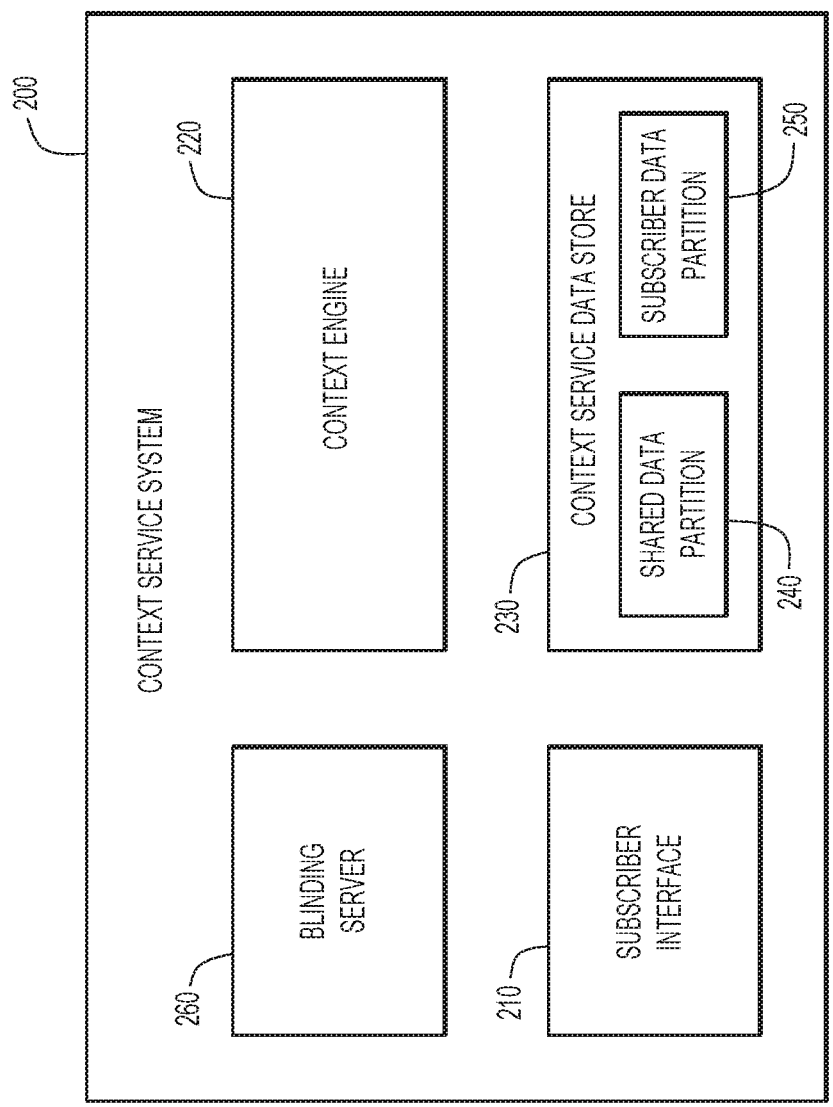
FIG. 2 is a block diagram illustrating the context service system, according to an example embodiment.

FIG. 2 is a block diagram illustrating a context service system 200, according to an example embodiment. The context service system 200 includes a subscriber interface 210, a context engine 220, a context service data store 230, and a blinding server 260. The context service data store 230 is shown to include a shared data partition 240 and the subscriber data partition 250. This is provided by way of an example and not by way of a limitation. In other example embodiments, configurations of the context service system 200 may include additional components, fewer components, or alternative components. For example, the context service data store 230 may include other subscriber data partitions (not shown) in addition to the subscriber data partition 250.

In FIG. 2, the subscriber interface 210 is configured to communicate with one or more subscribers. For example, the subscriber interface 210 may receive customer lookup requests that include an element of customer information such as a customer data identifier and provide subscribers with customer records or other customer data identifiers associated with the element of customer information in the customer lookup request.

The context engine 220 is configured to handle customer requests received via the subscriber interface 210 and retrieve data from the context service data store. For example, the context engine 220 is configured to identify other customer information that is associated with the element of customer information in the customer lookup request and determine whether the subscriber that submitted the customer lookup request has access to the associated customer information.

The context service data store 230 may store customer information associated with the one or more subscribers of the context service system 200. According to one or more example embodiments, the context service data store 230 may include a shared data partition 240 and a subscriber data partition 250. For example, in FIG. 2, the subscriber data partition 250 may be associated with the subscriber system 120 of FIG. 1.

The subscriber data partition 250 includes sets of customer information (e.g., customer records) known by their corresponding subscriber. For example, subscriber data partition 250 may include sets of customer information or customer records of which the subscriber system 120 of FIG. 1 is aware. The subscriber data partition 250 may be provided by the subscriber and updated over time. In one or more example embodiments, the subscriber data partition 250 is synchronized with a data store managed by the subscriber system (e.g., subscriber system 120 of FIG. 1). Although FIG. 2 is shown with the context service data store 230 including the subscriber data partition 250, in other example embodiments, one or more subscriber data partitions may be stored by a subscriber system and accessed by the context service system 200 via network communications.

The shared data partition 240 includes sets or records of related customer information that is generated based on the customer information in the subscriber data partition 250 and other subscriber data partitions (not shown) or customer information provided by one or more subscriber systems. The information in the shared data partition 240 may include information that each subscriber specifically permits to be used by the context service system 200 to provide associations to other systems. The information in the shared data partition 240 is blinded such that the true values of the information are unknown to the context service system 200.

According to one or more example embodiments, an end-to-end encryption scheme may additionally be used to protect the customer information stored by the context service data store 230. The subscriber systems may encrypt some or all data transmitted and/or stored by the context service data store 230. For example, a subscriber system may encrypt the entire customer record for all customer records to be stored by the context service system 200 or a portion of the customer records (e.g., any personally identifiable information (PII), private information, or otherwise sensitive information). The encryption and decryption scheme and/or various parameters used for encryption and decryption may be known only to the subscriber system. In this way, a subscriber may be assured with an additional layer of protection that prevents other subscribers or even the context service system 200 from unpermitted access to the subscriber's encrypted customer information.

The blinding server 260 may be a part of the context service system 200 or may be a separate entity such as a server remote from the context service system 200. The blinding server 260 holds a private key such as key k, noted above, and acts as an OPRF or VOPRF provider. In an example embodiment, the blinding server 260 applies a pseudorandom function (PRF) protocol on an input x, obtained from a subscriber, using a private key k.

A function is pseudorandom when the output $y=F(k, x)$ on any input x is indistinguishable from uniformly sampling any element in F's range, for any given k. In short, a pseudorandom function is efficient and deterministic, and returns an output y indistinguishable from random sequences. All outputs y of the PRF appear random regardless of the inputs. The PRF construction assures the random sampling. An Oblivious PRF (OPRF) is a protocol by which a client holding the input x may interact with a server holding k, such that the client learns $F(k, x)$ (for some PRF F), but the server learns nothing about x. The blinding server 260 plays the server role in an OPRF protocol, in which the subscriber is the client. Thus, the blinding server 260 does not learn anything about the input value x. In an example embodiment, the blinding server 260 computes $F(k, x)$ in cooperation with the subscriber.

A Verifiable Oblivious PRF (VOPRF) is protocol with the same properties as an OPRF, except that in addition, the server provides the client with information that allows the client to verify that the computed value of $F(k, x)$ is in fact correct. At the end of a VOPRF evaluation, the server has learned nothing about x, while client has learned both the value $F(k, x)$ and is assured that it has computed the correct value for $F(k, x)$. (In a non-verifiable OPRF, it is possible for the server to provide bad information that causes the client to compute an incorrect value for $F(k, x)$.) When the blinding server 260 is a VOPRF provider, the subscriber can verify that that the value $F(k, x)$ was computed correctly using key k, because key k is bound to a trusted public key $(k*G)$ that is provided to the subscriber.

In one example embodiment, to improve security of, and protect the private key k used to perform the blinding of data, the blinding server 260 may store the private key k in a hardware security module. In another example embodiment, the blinding server 260 may store the private key k in an internal memory or even externally to the blinding server 260 and the context service system 200. There may be variations in the storage location for the private key k, according to various example embodiment.

Additionally, according to one example embodiment, the blinding server 260 may apply rate limits on a global or per-client basis. That is, the blinding server 260 may control the rate of traffic sent or received from one or more subscribers as an additional security measure and to avoid overload. This prevents an attacker from "un-blinding" a blinded value $F(k, x)$ by submitting many guesses z for the value of x to the blinding server 260 in order to obtain blinded values $F(k, z)$ for the guesses, and recognizing the correct value z by virtue of the $F(k, z)$ being equal to $F(k, x)$.

Figure 3:
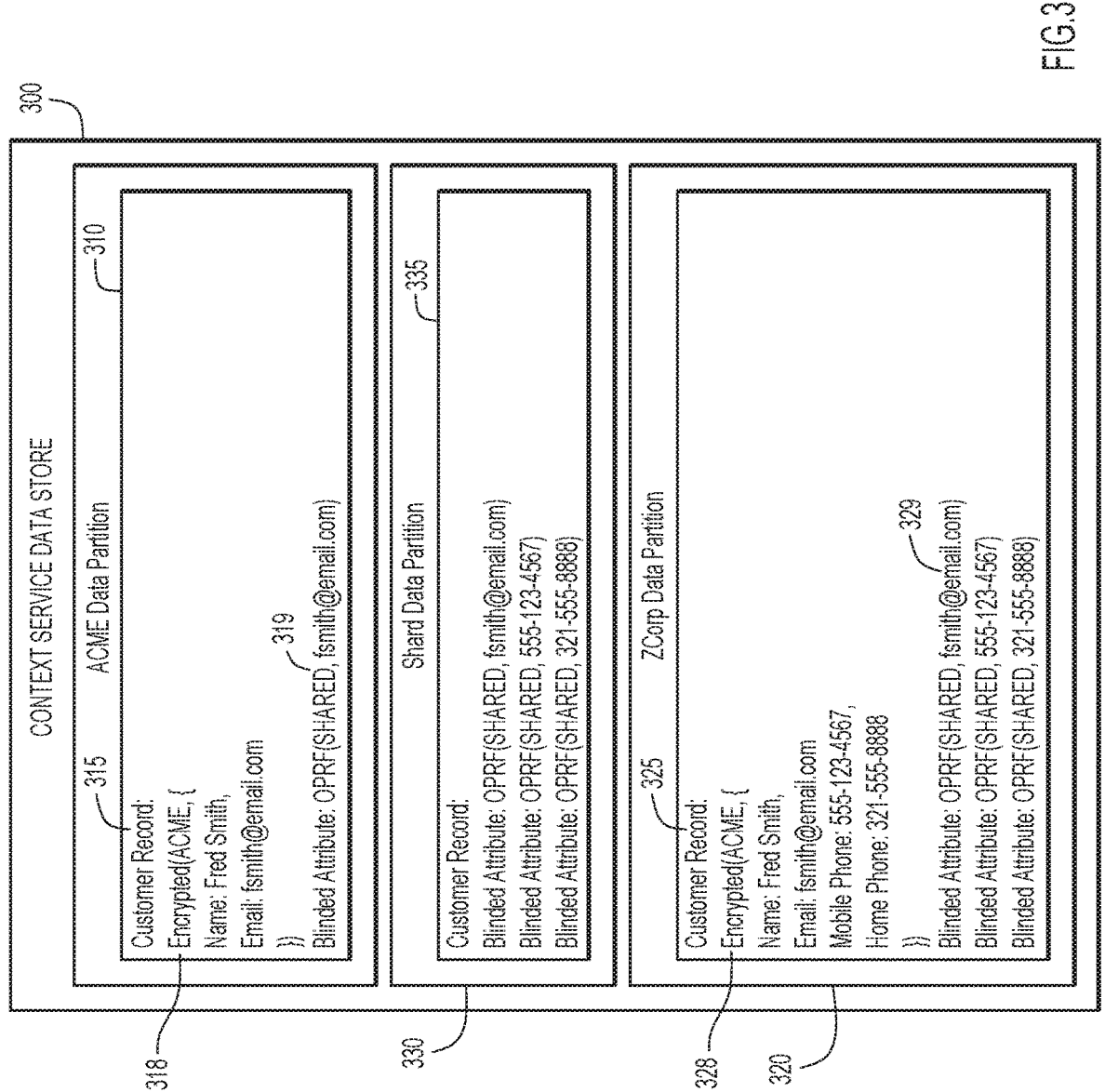
FIG. 3 is a block diagram illustrating a context service data store, according to an example embodiment.

FIG. 3 is a block diagram illustrating a context service data store 300, according to an example embodiment. The context service data store 300 is an example of the context data store 230 that is part of the context service system 200 shown in FIG. 2. The context service data store 300 includes a shared data partition and various subscriber data partitions.

In FIG. 3, an ACME data partition 310 is provided, and other subscriber data partitions, such as Z Corp data partition 320, are provided. The shared data partition is shown at 330. The ACME data partition 310 is for a subscriber named "ACME," and a Z Corp data partition 320 is for a subscriber named "Z Corp." Each data partition may include a number of sets of associated customer information or customer records. For the sake of brevity and not by way of a limitation, each of the data partitions 310, 320, and 330 in FIG. 3 are shown with one customer record or a set of associated customer information. For example, the ACME data partition 310 includes customer record 315, the Z Corp data partition 320 includes a customer record 325, and the shared data partition 330 includes a customer record 335, which stores a list of blinded attributes.

The context service data store 300 is implemented using an encryption scheme where all or portions of the customer information is encrypted using a cryptographic function. The encryption in whole or in part is applied separately to each customer record. The encryption and decryption scheme and/or various parameters used for encryption and decryption may be known only to the subscriber system or entities that the subscriber system entrusts in order to provide an additional layer of protection that prevents other subscribers or even the context service system 200 from accessing the subscriber's encrypted customer information. For example, customer information 318 in customer record 315 of the ACME data partition 310 is encrypted. Similarly, customer information 328 in the customer record 325 of the Z Corp data partition 320 is encrypted.

Additionally, the subscriber data partitions store the encrypted customer record with associated blinded attributes so that true values of the elements of customer information can be obtained based on the blinded attributes.

Figure 4A:
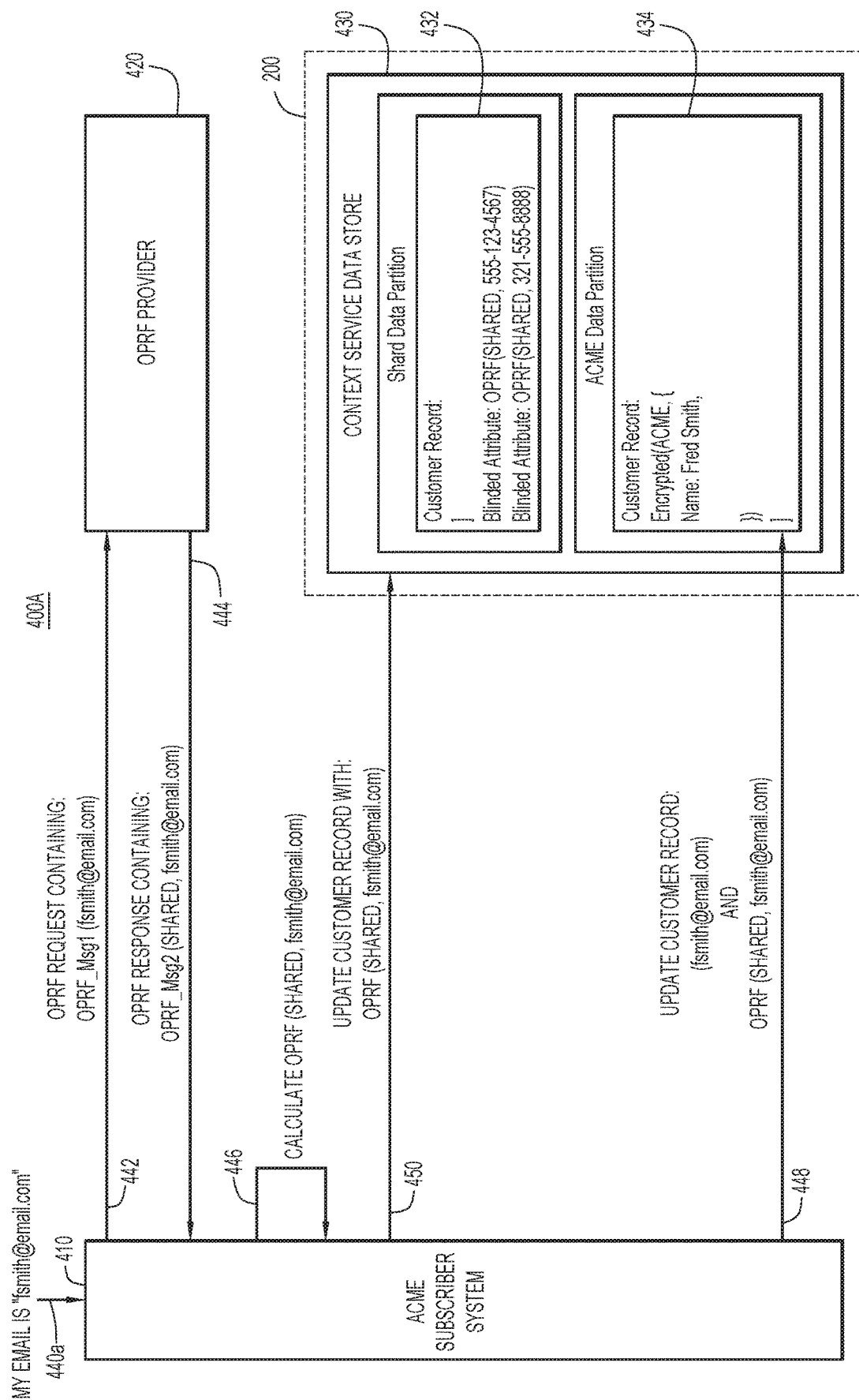
FIG. 4A shows a process for blinding a new attribute, according to an example embodiment.

For example, for the email address "fsmith@email.com" in customer record 315, the ACME subscriber system may use a blinding server 260 of FIG. 2 to generate a blinded attribute 319 (e.g., OPRF (SHARED, fsmith@email.com)) for the email address. FIG. 4A shows a process 400A for blinding a new attribute, according to an example embodiment. According to an example embodiment, the process 400a is performed by a system such as, for example, the context service system 200 of FIG. 2 or a similar computing platform. The process 400a involves interactions between the ACME subscriber system 410, an OPRF provider 420 and a context service data store 430 (that is part of the context service system 200).

The OPRF provider 420 is an example of a blinding server 260 shown in FIG. 2. In an example embodiment of FIG. 4A, the OPRF provider 420 is a separate, remote entity from the context service system 200. The ACME subscriber system 410 is configured with an address of the OPRF provider 420 and an address of the context service system 200 when these components are remote from one another. In another example embodiment, the OPRF provider 420 may be a part of the context service system, as shown in FIG. 2. In this example configuration, the ACME subscriber system 410 is configured with the address of the context service system 200 such that the context service system 200 directs blinding requests of the ACME subscriber system 410 to the OPRF provider 420, as explained in further detail below.

The context service data store 430 includes a shared data partition 432 and a subscriber's data partition (an ACME data partition) 434. In one example, as shown in FIG. 4A, the shared data partition 432 and the subscriber's data partition (ACME data partition) 434 are the same as that shown in FIG. 3.

In FIG. 4A, the process 400A begins with operation 440a, in which a new customer attribute is received. In particular, the ACME subscriber system 410 receives a new customer attribute ("My email is fsmith@email.com"). In operation 442, the ACME subscriber system 410 provides the new attribute to the OPRF provider 420. In particular, the ACME subscriber system 410 sends an OPRF request containing the element of the customer information OPRF_Msg1 (fsmith@email.com).

The OPRF provider 420 holds a private key "SHARED" and acts as an OPRF server or a VOPRF server. The OPRF provider 420 uses the element of the customer information as an input value x, and applies the private key SHARED to execute a pseudorandom function F. In other words, the OPRF provider 420 performs F (private key, element of customer information) and transmits the results to the ACME subscriber system 410. That is, at 444, the OPRF provider 420 provides an OPRF response containing output value of F (SHARED, x). In one example embodiment, the OPRF provider 420 may also use a shared salt value represented by a string "SHARED" to indicate that the blinded attribute is sharable outside the ACME subscriber system 410. The OPRF response contains OPRF_Msg2 (SHARED, fsmith@email.com). According to one example embodiment, the OPRF provider 420 can be a VOPRF server in which case, the ACME subscriber system 410 can verify that the value contained in the OPRF response is the correct value of F for the inputs (SHARED, x) using its public key (SHARED*G).

At 446, the ACME subscriber system 410 calculates the blinded attribute bx using the OPRF response received at 444. That is, using the original customer information and the OPRF messages, the ACME subscriber system 410 can calculate a blinded attribute bx for the element of customer information. In an example embodiment where the OPRF provider 420 is a VOPRF server, the subscriber system can also use the public key (SHARED*G) to verify that the blinded attribute bx is the correct value for the inputs (SHARED, x). In FIG. 4A, bx is OPRF (SHARED, fsmith@email.com) calculated at 446.

At 448, the ACME subscriber system 410 sends update customer record request containing the blinded attribute bx to the context service system 200. The blinded attribute bx corresponds to the email address fsmith@email coin. The request includes fsmith@email.com and OPRF (Shared, fsmith@email.com). That is, the ACME data partition 434 is updated with new encrypted attributes including fsmith@email.com and new blinded attribute based on OPRF exchange. At 450, the context service system 200 also updates the customer record on a shared data partition 432 with the new blinded attribute, OPRF (SHARED, fsmith@email.com). According to another example embodiment, operations 448 and 450 may occur at substantially same time or in a reverse order, or combined into a single operation. For example, when the operation 448 is combined with the operation 450, the ACME subscriber system 410 may provide the new attribute fsmith@email.com and the new blinded attribute OPRF (SHARED, fsmith@email.com) to the context service system 200 and the context service system 200 may determine to update the ACME data partition 434 and the shared data partition 432 based on user preferences or communicated additional parameters. According to various example embodiments, the ACME subscriber system 410 transmits the blinded attribute to the context service system 200 for storage in the ACME data partition 310.

Similarly, in the customer record 325 (FIG. 3), the Z Corp subscriber system may generate blinded attributes 329 ((e.g., OPRF (SHARED, fsmith@email.com)) for the email address, (e.g., OPRF (SHARED, 555-123-4567)) mobile telephone number, and/or (e.g., OPRF (SHARED, 321-555-8888)) home telephone number) based on the Z Corp subscriber communicating with the blinding server 260 to apply OPRF or VOPRF to the values to be shared. The Z Corp subscriber system may then transmit the blinded attributes 329 to the context service system 200 for storage in the Z Corp data partition 320.

In short, the blinded attributes 319 and 329, for example, are stored in association with the true values of the elements of customer information so that corresponding elements of customer information can be obtained from the respective blinded attribute. The blinded attributes enable the context service system to determine whether an element of customer information is associated with the encrypted information that in the subscriber data partition, based on information in the shared data partition.

Additionally, the blinded attributes of a customer record to be shared are stored in the shared data partition so that subscribers can learn associations between various elements of the customer information without learning true value of the elements.

For example, for the email address "fsmith@email.com" in customer record 315, the ACME subscriber system may use a shared OPRF or VOPRF key (the input k in the above description of OPRFs), which is represented by the "SHARED" string in the OPRF function shown in customer record 315, to generate a blinded attribute ((e.g., OPRF (SHARED, fsmith@email.com)) for the email address. The ACME subscriber system may then transmit the blinded attribute 319 to the context service system for storage in the shared data partition 330. Similarly, the Z Corp subscriber system may generate blinded attributes (e.g., using OPRF) for the email address, mobile telephone number, or home telephone number using the shared salt value. The Z Corp subscriber system may then transmit the blinded attributes to the context service system for storage in the shared data partition 330. The generated blinded attributes ((e.g., OPRF (SHARED, fsmith@email.com)) for the email address, (e.g., OPRF (SHARED, 555-123-4567)) mobile telephone number, and/or (e.g., OPRF (SHARED, 321-555-8888)) home telephone number) are stored together as customer record 335.

Since the context service system does not store the true values or actual customer information in the shared data partition 330 but instead stores blinded attributes of the customer information, the customer information is prevented from being shared or accessed either intentionally or unintentionally. Furthermore, in some example embodiments, the context service system may not know (e.g., the shared salt value or the subscriber salt values) used to encrypt the customer information. Accordingly, even the context service system may not access the customer information in the context service data store 300.

According to an example embodiment, the context service system may identify the blinded attributes of customer information in customer records across various subscriber data partitions that had the OPRF or VOPRF protocol applied using the shared salt value and aggregate them into the shared data partition 330.

According to an example embodiment, a key management server may be configured to disseminate a shared salt value to the subscriber systems. For example, the key management server may provide a subscriber system with a shared salt value that is also provided to all other subscriber systems. Accordingly, a subscriber system may use the shared salt value to determine which elements of subscriber's customer information are to be used by the context service system to assist other subscribers i.e., shared with other subscribers.

Although FIG. 2 and FIG. 3 show only a single shared data partition 240 in FIG. 2 and a single shared data partition 330 in FIG. 3, for illustrative purposes, in other example embodiments, multiple shared data partitions may also be implemented. Multiple shared data partitions may allow subscribers to have different sharing levels with different groups. For example, shared data partitions may be established for a group of business partners, a group of competitors, a group of customers, and/or a general public group and each group may be assigned a different shared salt value for the group. Each subscriber system belonging to the group may obtain a shared salt value for the group of subscribers. Accordingly, a subscriber system may receive multiple shared salt values for a multitude of groups and use the shared salt values to determine which blinded attributes of the elements of customer information to allow the context service system to use to assist other subscribers.

In an example embodiment, by having one or more shared data partitions, associations between elements of customer information can be discovered even when one or more of the subscribers are offline. Further, according to an example embodiment, the intersections are discoverable pointwise: one element at a time.

Figure 4B:
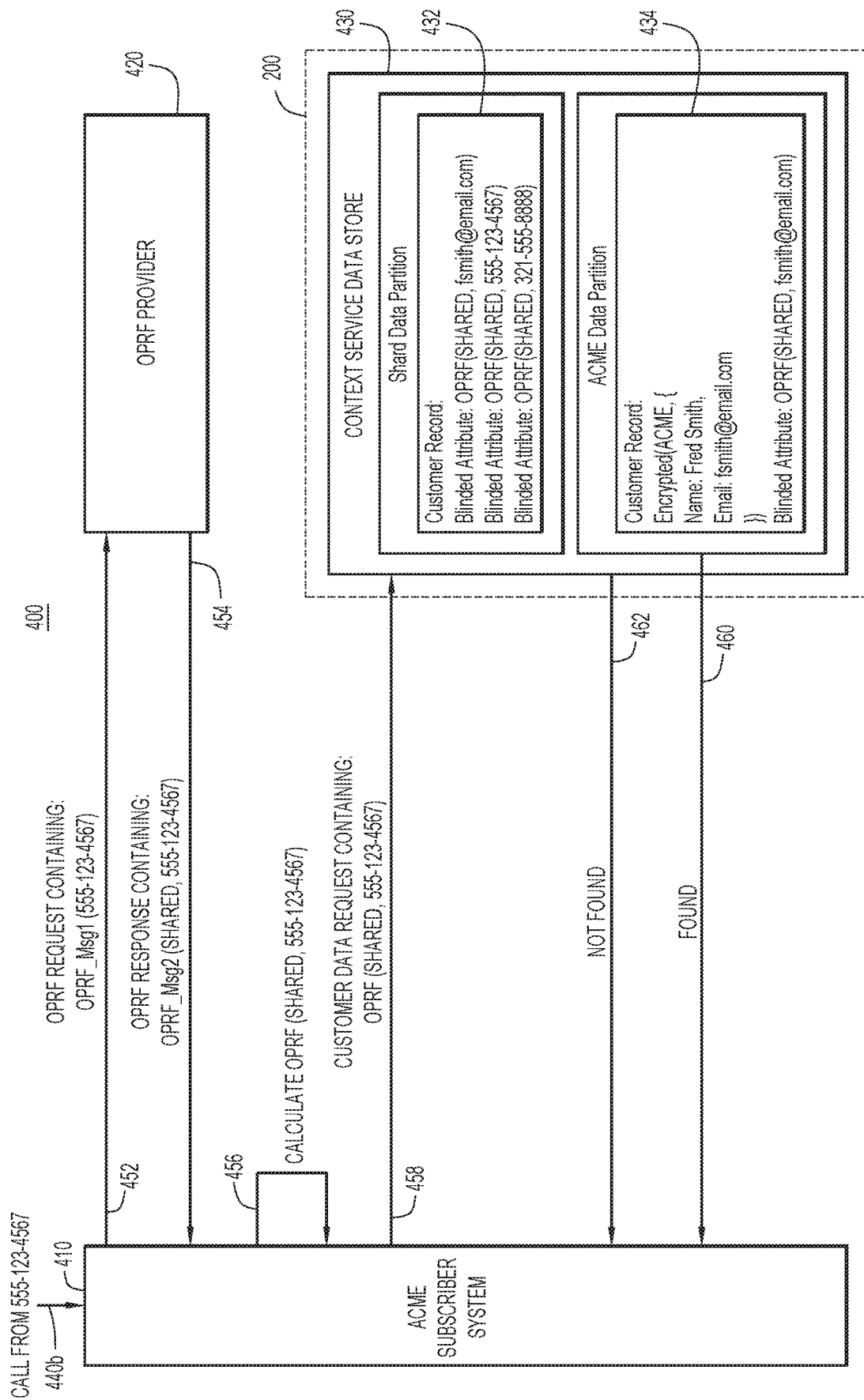
FIG. 4B shows a process for providing a subscriber system with one or more of blinded attributes of a customer record from a shared data partition, according to an example embodiment.

FIG. 4B shows a process 400 for providing a subscriber system with a customer record from a shared data partition, according to an example embodiment. According to an example embodiment, the process 400 is performed by a system such as, for example, the context service system 200 of FIG. 2 or a similar computing platform. The process 400 involves interactions between a subscriber system 410 (e.g., ACME subscriber system), an OPRF provider 420 and a context service data store 430 (that is part of the context service system 200), as explained above with reference to FIG. 4A.

The OPRF provider 420 is an example of a blinding server 260 shown in FIG. 2. In an example embodiment of FIG. 4B, the OPRF provider 420 is a separate, remote entity from the context service system 200. The subscriber system 410 is configured with an address of the OPRF provider 420 and an address of the context service system 200 when these components are remote from one another. In another example embodiment, the OPRF provider 420 may be a part of the context service system, as shown in FIG. 2. In this example configuration, the subscriber system 410 is configured with the address of the context service system 200 such that the context service system 200 directs blinding requests of the subscriber system 410 to the OPRF provider 420, as explained in further detail below.

The context service data store 430 includes a shared data partition 432 and a subscriber's data partition (an ACME data partition) 434. In one example, as shown in FIG. 4B, the shared data partition 432 and the subscriber's data partition (ACME data partition) 434 are the same as that shown in FIGS. 3 and 4A.

The process 400 begins by the subscriber system 410 (ACME subscriber system) receiving, at 440b, an element of customer information (telephone number: 555-123-4567) during operation of the subscriber system. For example, the subscriber system 410 receives a call from the telephone number 555-123-4567 that may be unknown to the subscriber system 410. The telephone number of 555-123-4567 is an element of customer information. One of ordinary skill in the art would readily recognize that this is provided by way of an example only and not by way of a limitation. For example, a call center system may receive a text from a telephone number. Alternatively, a call center may receive an email or message from a messaging service from an email address or user name that is not in the call center system's database. That is, the subscriber system 410 may receive other elements of customer information such as user names, email addresses, social media account identifiers, or any other identifiers may be used as elements of customer information and the subscriber system 410 may come across the element of customer information by other means.

In FIG. 4B, the subscriber system 410 queries the context service data store 430 for associations with the element of customer information.

Before querying the context service data store 430, the subscriber system 410 blinds the element of customer information by the following process. At 452, the subscriber system 410 transmits, to the OPRF provider 420, an OPRF request containing the element of the customer information (OPRF_Mesg1 (555-123-4567)).

The OPRF provider 420 holds a private key "SHARED" and acts as an OPRF server or a VOPRF server. The OPRF provider 420 uses the element of the customer information as an input value x, and applies the private key SHARED to execute a pseudorandom function F. In other words, the OPRF provider 420 performs F (private key, element of customer information) and transmits the results to the subscriber system 410. That is, at 454, the OPRF provider 420 provides an OPRF response containing output value of F (SHARED, x). In one example embodiment, the OPRF provider 420 may also use a shared salt value represented by a string "SHARED" to indicate that the blinded attribute is sharable outside the subscriber system 410. The OPRF response contains OPRF_Msg2 (SHARED, 555-123-4567). According to one example embodiment, the OPRF provider 420 can be a VOPRF server in which case, the subscriber system 410 can verify that the value contained in the OPRF response is the correct value of F for the inputs (SHARED, x) using its public key (SHARED*G).

At 456, the subscriber system 410 calculates the blinded attribute bx using the OPRF response received at 454. That is, using the original customer information and the OPRF messages, the subscriber system 410 can calculate a blinded attribute bx for the element of customer information. In an example embodiment where the OPRF provider 420 is a VOPRF server, the subscriber system can also use the public key (SHARED*G) to verify that the blinded attribute bx is the correct value for the inputs (SHARED, x). In FIG. 4B, bx is OPRF (SHARED, 555-123-4567) calculated at 456.

At 458, the subscriber system 410 sends a customer data request containing the blinded attribute bx to the context service system 200. The blinded attribute bx corresponds to the telephone number 555-123-456. The request is a request for associations with the blinded attribute bx. The request includes OPRF (Shared, 555-123-4567).

Based on the customer data request, the context service system 200 searches the customer data partition (the ACME data partition 434) for encrypted customer records with at least one of the blinded attributes attached. The context service system 200 transmits the encrypted customer records to the customer, if found at 460. In one example embodiment, the context service system 200 may also transmit other blinded attributes it used to search for the customer record, since that could help the customer evaluate which of possibly multiple customer records is the best match (i.e., the one with the most overlap with the blinded attribute set).

According to another example embodiment, the subscriber system 410 is caching customer records, then the context service data store 430 transmits the blinded attributes and the subscriber system 410 performs the matching locally.

In an example embodiment of FIG. 4B, the context service system 200 looks in a shared data partition 432 and then the ACME data partition 434 for the provided blinded attribute OPRF (SHARED, 555-123-5667). All found records in both partitions are returned at 460. If the record is not found, a not found message is returned, at 462.

Optionally, in the event, the ACME subscriber system 410 finds an association between the blinded attributes of a customer record and the phone number, the ACME subscriber system 410 may update its customer record to add the phone number (Blinded Attribute: OPFR (SHARED, 555-123-4567), (Phone: 555-123,4567)). That is, the ACME subscriber system 410 updates its customer record to store (bA, A).

In yet another example embodiment, the context service system may transmit one or a predetermined number of the associated blinded attributes (a subset of the associated blinded attributes) and the subscriber system 410 may query for additional associated blinded attributes if the previously provided subset of associated blinded attributes is determined to be insufficient to obtain the needed association. Further, according to an example embodiment, the shared data partition 432 may store the blinded attributes in a predetermined order based on importance, frequency of use, or chronologically, for example. As a result, only a subset of the associated blinded attributes may be provided to the subscriber system 410 for improved efficiency, based on the stored order.

Using the received blinded attributes, the subscriber system 410 determines that the element of the customer information, received at 440b, is associated with the customer record of Fred Smith. In FIG. 4B, the subscriber system 410 finds OPRF (SHARED, fsmith@email.com) in the subscriber's data partition 434. The subscriber system 410 then queries its local database or the subscriber's data partition 434 for the element of the customer information corresponding to the blinded attribute. In particular, the subscriber system 410 queries for any unblinded attributes A such that (A, bA) is in the database for some bA received from the shared data partition 432. Based on an association between the blinded attributes, the subscriber system 410 retrieves the customer record from the subscriber's data partition 434. The context service system 200 returns the found record, at 460.

Also, the subscriber system 410 may store the attribute A to be associated with the attribute x. According to an example embodiment, the subscriber system 410 may store a new association (x, A) by adding the telephone number (555-123-4567) to the customer record stored in the subscriber's data partition 434, at 464.

In one or more example embodiments, the subscriber system 410 and other subscriber systems (not shown) contribute associations stored in the shared data partition 432. When subscriber system 410 learns a new association between two attributes X and Y, it may take the following actions. First, the subscriber system 410 conducts the OPRF or VOPRF protocol with the OPRF provider 420 to compute the blinded attribute $bX=F(k, X)$ and to compute the blinded attribute $bY=F(k, Y)$. In one or more example embodiments, the subscriber system 410 may perform a password-based key derivation on the attributes X and Y before inputting them to the OPRF or VOPRF protocol. The subscriber system 410 stores the associations (X, bX) and (Y, bY)

between the unblinded and blinded attributes in a local database or the subscriber's data partition 434 and optionally, may also store a new association (X, Y) between unblinded attributes in its database (for example in its encrypted customer record). The subscriber system 410 also sends the association (bX, bY) of the blinded attributes to the shared data partition 432 to be shared with other subscribers.

For example, the subscriber system 410 may discover address information for Fred Smith (123 ABC street). The subscriber system 410 sends a request to the OPRF provider 420 to execute the OPRF protocol or VOPRF protocol and blinds the new address element to obtain OPRF (SHARED, 123 ABC street). The subscriber system 410 stores the new address element and the corresponding blinded attribute in the customer record. Additionally, the subscriber system 410 stores in the shared data partition the new blinded attribute OPRF (SHARED, 123 ABC street) with at least one other corresponding blinded attribute. Depending on a particular configuration, the OPRF (SHARED, 123 ABC street) may be stored in association with OPRF (SHARED, fsmith@email.com) and/or OPRF (SHARED, 555-123-4567). The shared data partition stores the new blinded attribute in the customer record in association with other related blinded attributes. As such, the subscriber system 410 contributes attribute associations as well as obtains one or more associations for a given attribute.

In one or more example embodiments, as data sets in the context service data store 430 increase in size and the number of subscriber data partitions grows there is an increased likelihood that multiple customer records may be identified in the subscriber data partition. According to various example embodiments, the context service system may also be configured to generate scores (e.g., confidence scores) for the identified customer records and/or rank the identified customer records. The context service system may provide the subscriber system with a top ranked customer record or a set of top ranked customer records. Additionally, the context service system may provide one or more or all of the customer records to the subscriber system along with their calculated scores to allow the subscriber system to select.

According to various example embodiments, the confidence score for an identified customer record may be based on the number of other subscriber systems that have identified the association between the customer record and the element of customer information and/or how recent the association between the customer record and the element of customer information was made. For example, if a large number of subscribers have identified an association between the customer record and the element of customer information, it is more likely to be an accurate identification. Accordingly, the confidence score should be higher than for a customer with fewer subscribers having identified the association.

Furthermore, associations between customer records and the element of customer information may be timestamp according to when they were created or updated. An association between a customer record and the element of customer information with a recent timestamp may be more accurate than an association with an older timestamp because the association with the recent timestamp may reflect updated information that has not reached the data partition for another subscriber. For example, a customer record may include a residential address for a user. This information may be reflected in a customer record with a particular timestamp. However, the user may have moved to a new address. This new information may be reflected in a customer record with a more recent timestamp.

In one or more example embodiment, using the OPRF provider for blinding ensures that raw attributes never leave the subscriber that observed them. Further, separation of the OPRF server and the context service system means that the context service system is unable to un-blind the blinded attributes it holds. Also, relative to the private set intersection techniques, one or more example embodiments rely on cryptographic primitives, which are easy to implement.

One or more example embodiments provide a shared service which allows multiple subscribers of a common service to securely share associations of customer attributes without revealing them to the shared service. A subscriber can only confirm that another subscriber observed an association. The subscriber cannot query for anything that the subscriber itself has not already observed.

One or more example embodiment provide a subscriber system that pre-hashes attribute value with a password-based key derivation function such as scrypt. In this case, an additional layer of protection is provided against the context service un-blinding the hashes. That protection is provided in addition to the blinding server rate-limiting queries from the context service.

Figure 5:
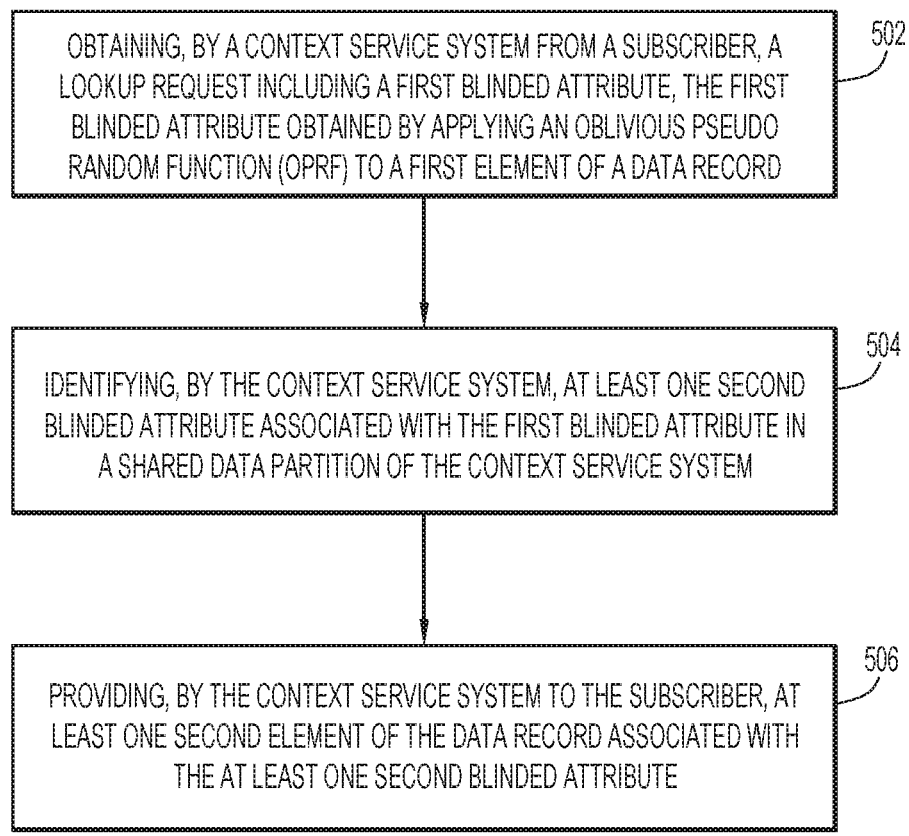
FIG. 5 is a flowchart illustrating a method of providing an associated blinded attribute, according to an example embodiment.

FIG. 5 is a flowchart illustrating a method 500 of providing an associated blinded attribute, according to an example embodiment. The method 500 is performed when a subscriber system encounters a new element of a customer record and needs to discover related attributes. The method 500 is executed by the context service system 200 (FIG. 2) and includes, at 502, obtaining, from a subscriber, a lookup request including a first blinded attribute. The first blinded attribute is obtained by applying an oblivious pseudo random function (OPRF) to a first element of a data record. At 504, the method 500 includes identifying at least one second blinded attribute associated with the first blinded attribute in a shared data partition of the context service system. At 506, the context service system provides, to the subscriber, at least one second element of the data record associated with the at least one second blinded attribute.

According to one or more example embodiments, the method 500 further includes identifying, in a subscriber data partition, by the context service system, the at least one second element of the data record associated with the first element based on the at least one second blinded attribute.

According to one or more example embodiments, the method 500 further includes storing, in the data record of the subscriber data partition, the first element in association with the at least one second element. The data record includes the first element and the at least one second element which are encrypted information of a customer record of the subscriber.

According to one or more example embodiments, the first element of the data record and the at least one second element of the data record are customer information stored in association with each other forming a customer record.

According to one or more example embodiments, the lookup request is an association request for the at least one second element of the data record. The data record includes a plurality of elements stored, in association with each other in the shared data partition, as the first blinded attribute and the at least one second blinded attribute.

According to one or more example embodiments, the method 500 further includes communicating, by the context service system, with one or more other subscribers, to obtain the at least one second blinded attribute which includes a plurality of second blinded attributes and storing, by the context service system, the first blinded attribute and the plurality of second blinded attributes, as the data record in the shared data partition. The data record relates to a single customer.

According to one or more example embodiments, the OPRF is a verifiable OPRF and the context service system stores a private key for the verifiable OPRF that corresponds to a public key of the subscriber.

Figure 6:
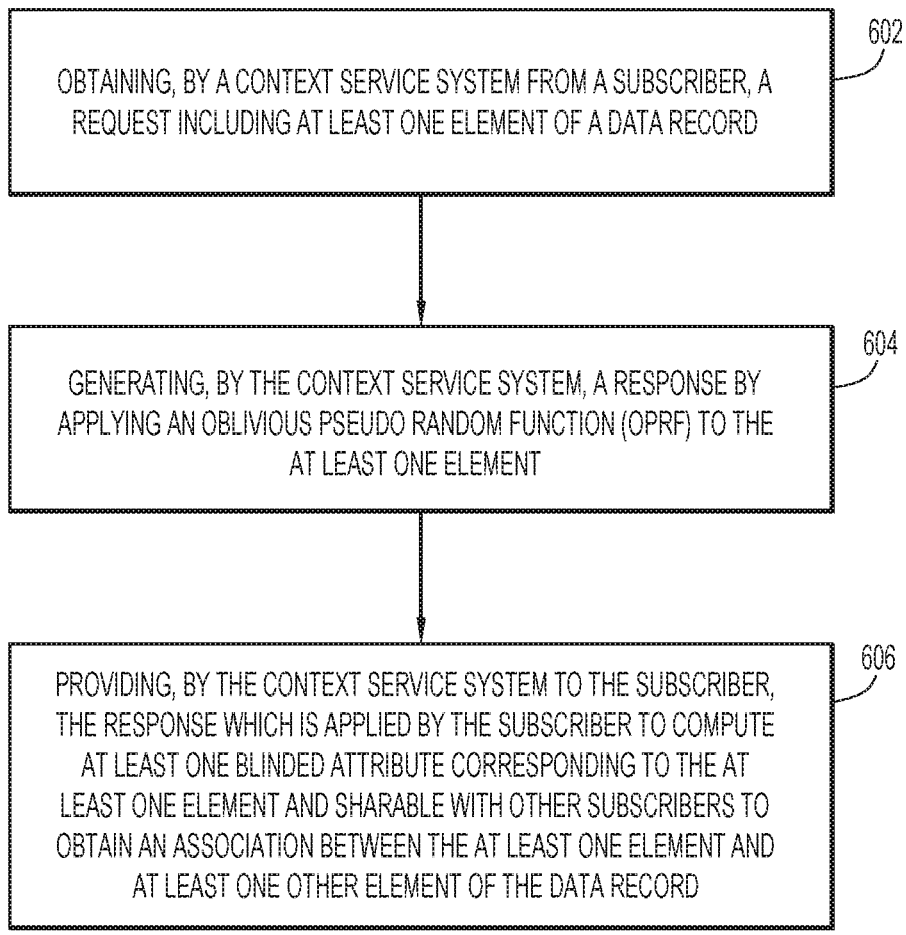
FIG. 6 is a flowchart illustrating a method of generating a blinded attribute corresponding to an element of a data record, according to an example embodiment.

FIG. 6 is a flowchart illustrating a method 600 of generating a blinded attribute corresponding to an element of a data record, according to an example embodiment. The method 600 is performed when a subscriber system may learn a new association between two elements of a customer record in which case, the subscriber system blinds each of the two elements to share the association. At 602, the context service system obtains, from a subscriber, a request including at least one element of a data record. At 604, the context service system generates a response by applying an oblivious pseudo random function (OPRF) to the at least one element. At 606, the context service system provides, to the subscriber, the response. The response is applied by the subscriber to compute at least one blinded attribute corresponding to the at least one element and sharable with other subscribers to obtain an association between the at least one element and at least one other element of the data record.

According to one or more example embodiments, the method 600 further includes storing, in a hardware security module of the context service system, a private key and generating the response based on the private key.

According to one or more example embodiments, the OPRF is a verifiable OPRF.

According to one or more example embodiments, the at least one element of the data record includes a first element of the data record and a second element of the data record. The first element and the second element include customer information of a customer data record of the subscriber. The at least one blinded attribute includes a first blinded attribute corresponding to the first element and a second blinded attribute corresponding to the second element.

According to one or more example embodiments, the method 600 further includes storing, in a shared data partition, the first blinded attribute associated with the second blinded attribute and storing, in a subscriber data partition, the first element with the first blinded attribute and the second element with the second blinded attribute.

According to one or more example embodiments, the method 600 further includes obtaining, from the subscriber, a lookup request including the at least one blinded attribute which is a first blinded attribute and based on the lookup request, identifying at least one second blinded attribute stored in the same data record of a shared data partition storage as the first blinded attribute. The method 600 further includes providing, to the subscriber, the at least one other element of the data record that corresponds to the at least one second blinded attribute such that the subscriber obtains the at least one other element from a subscriber partition storage based on the obtained second blinded attribute.

According to one or more example embodiments, the request includes a first address information identifying a blinder processor and the lookup request includes a second address information identifying a context engine of the context service system. The second address information is different from the first address information.

Figure 7:
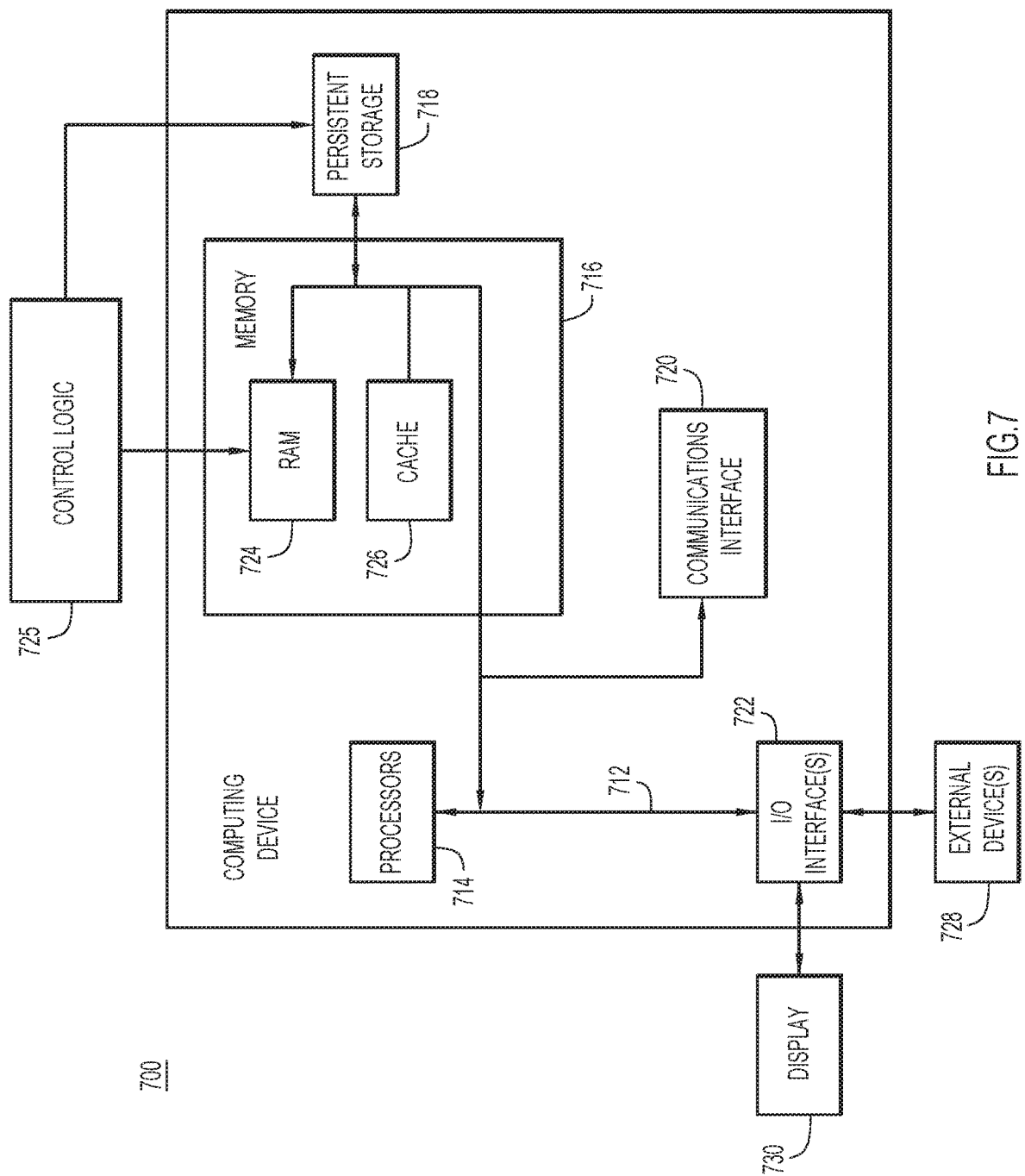
FIG. 7 is a hardware block diagram of a computing device configured to generate a blinded attribute and configured to provide an associated blinded attribute, according to various example embodiments.

FIG. 7 is a hardware block diagram of a computing device 700 configured to perform the functions of the context service system and/or the blinding server as described above in connection with FIGS. 2-6, according to various example embodiments. The functions include blinding a newly discover element of a customer data record to obtain related attributes based on associations shared by other subscribers. The functions further include developing new associations between attributes by blinding the attributes and storing them in association with one another. It should be appreciated that FIG. 7 provides only an illustration of various embodiments and does not imply any limitations with regard to the environments in which different embodiments may be implemented. Many modifications to the depicted environment may be made.

As depicted, the computing device 700 includes a bus 712, which provides communications between computer processor(s) 714, a memory 716, a persistent storage 718, communications unit 720, and input/output (I/O) interface(s) 722. The bus 712 can be implemented with any architecture designed for passing data and/or control information between processors (such as microprocessors, communications and network processors, etc.), system memory, peripheral devices, and any other hardware components within a system. For example, the bus 712 can be implemented with one or more buses.

The memory 716 and persistent storage 718 are computer readable storage media. In the depicted embodiment, the memory 716 includes a random access memory (RAM) 724 and a cache (cache memory) 726. In general, the memory 716 can include any suitable volatile or non-volatile computer readable storage media that stores instructions for the control logic 725.

The computing device 700 may be an OPRF provider, a context service system and/or both. In one form, the control logic 725 includes instructions for obtaining, from a subscriber, a request including at least one element of a data record, generating a response by applying an oblivious pseudo random function (OPRF) to the at least one element, and providing, to the subscriber, the response which is applied by the subscriber to compute at least one blinded attribute corresponding to the at least one element and sharable with other subscribers to obtain an association between the at least one element and at least one other element of the data record. In another form, the control logic 725 may include obtaining, from a subscriber, a lookup request including a first blinded attribute, the first blinded attribute obtained by applying an oblivious pseudo random function (OPRF) to a first element of a data record, identifying at least one second blinded attribute associated with the first blinded attribute in a shared data partition of the context service system, and providing, to the subscriber, the at least one second blinded attribute.

The control logic (software) 725 may be stored in the memory 716 or the persistent storage 718 for execution by the computer processor(s) 714.

One or more programs may be stored in persistent storage 718 for execution by one or more of the respective computer processor(s) 714 via one or more memories of memory 716. The persistent storage 718 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by the persistent storage 718 may also be removable. For example, a removable hard drive may be used for persistent storage 718. Other examples include optical and magnetic disks, thumb drives, and smart cards that are inserted into a drive for transfer onto another computer readable storage medium that is also part of persistent storage 718.

The communications unit 720, in these examples, provides for communications with other data processing systems or devices. In these examples, communications unit 720 includes one or more network interface cards. Communications unit 720 may provide communications through the use of either or both physical (wired) and wireless communications links.

The I/O interface(s) 722 allows for input and output of data with other devices that may be connected to the computing device 700. For example, the I/O interface 722 may provide a connection to external devices 728 such as a keyboard, keypad, a touch screen, and/or some other suitable input device. External devices 728 can also include portable computer readable storage media such as database systems, thumb drives, portable optical or magnetic disks, and memory cards.

Software and data used to practice embodiments can be stored on such portable computer readable storage media and can be loaded onto persistent storage 718 via I/O interface(s) 722. I/O interface(s) 722 may also connect to a display 730. The display 730 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing system employed by the present embodiments may be implemented by any personal or other type of computer or processing system (e.g., desktop, laptop, personal data assistant (PDA), mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, wireless access network (WAN), Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., local area network (LAN), wireless access network (WAN), Internet, Intranet, a virtual private network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

The present embodiments may employ any number of any type of user interface (e.g., Graphical User Interface (GUI), command-line, prompt, etc.) for obtaining or providing information (e.g., data relating to providing enhanced delivery options), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In still another example embodiment, an apparatus is provided which includes a communication interface configured to enable network communications on a network, a memory configured to store executable instructions, and a processor coupled to the communication interface and the memory. The processor is configured to obtain a lookup request including a first blinded attribute. The first blinded attribute is obtained by applying an oblivious pseudo random function (OPRF) to a first element of a data record. The processor is further configured to identify at least one second blinded attribute associated with the first blinded attribute in a shared data partition of a storage system and provide at least one second element of the data record associated with the at least one second blinded attribute.

According to one or more example embodiments, the processor is further configured to identify, in a subscriber data partition of the storage system, the at least one second element of the data record associated with the first element based on the at least one second blinded attribute.

According to one or more example embodiments, the processor is further configured to store, in the data record of the subscriber data partition, the first element in association with the at least one second element. The data record includes the first element and the at least one second element, which are encrypted information of a customer record of the subscriber.

According to one or more example embodiments, the first element of the data record and the at least one second element of the data record are customer information stored in association with each other forming a customer record.

According to one or more example embodiments, the processor is further configured to communicate with one or more other subscribers to obtain the at least one second blinded attribute which includes a plurality of second blinded attributes and store the first blinded attribute and the plurality of second blinded attributes, as the data record in the shared data partition, the data record relating to a single customer of the subscriber.

According to one or more example embodiments, the OPRF is a verifiable OPRF. The processor is further configured to store in the memory a private key for the verifiable OPRF that corresponds to a public key of the subscriber.

In still another example embodiment, a system is provided which includes one or more processors, a subscriber data partition including a first set of customer records associated with a first subscriber, a shared data partition including a second set of customer records associated with a set of subscribers including the first subscriber and at least one second subscriber, and a non-transitory computer-readable medium storing instructions. The instructions, when executed by the one or more processors, cause the one or more processors to obtain a lookup request including a first blinded attribute. The first blinded attribute is obtained by applying an oblivious pseudo random function (OPRF) to a first element received by the first subscriber. The instructions, when executed by the one or more processors, further cause the one or more processors to identify, in the shared data partition, at least one second blinded attribute associated with the first blinded attribute and provide, to the first subscriber, the at least one second blinded attribute.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   obtaining, by a context service system from a subscriber, a lookup request including a first blinded attribute, the first blinded attribute obtained by applying an oblivious pseudo random function (OPRF) to a first element of a data record;
   identifying, by the context service system, at least one second blinded attribute associated with the first blinded attribute in a shared data partition of the context service system that stores contextual information of the subscriber in a form of attributes that are sharable with other subscribers, wherein the shared data partition stores the first blinded attribute obtained from the data record in a first subscriber data partition of the subscriber and the at least one second blinded attribute obtained from at least one second subscriber data partition of the other subscribers; and
   providing, by the context service system to the subscriber, at least one second element of the data record associated with the at least one second blinded attribute.

2. The method of claim 1, further comprising:
   identifying, in the at least one second subscriber data partition, by the context service system, the at least one second element of the data record associated with the first element based on the at least one second blinded attribute.

3. The method of claim 2, further comprising:
   storing, in the data record of the first subscriber data partition, the first element in association with the at least one second element, the data record including the first element and the at least one second element which are encrypted information of a customer record of the subscriber.

4. The method of claim 2, wherein the first element of the data record and the at least one second element of the data record are customer information stored in association with each other forming a customer record.

5. The method of claim 4, wherein the lookup request is an association request for the at least one second element of the data record, the data record including a plurality of elements stored, in association with each other in the shared data partition, as the first blinded attribute and the at least one second blinded attribute.

6. The method of claim 1, further comprising:
   communicating, by the context service system, with one or more of the other subscribers, to obtain the at least one second blinded attribute which includes a plurality of second blinded attributes; and
   storing, by the context service system, the first blinded attribute and the plurality of second blinded attributes, as the data record in the shared data partition,
   wherein the data record relates to a single customer.

7. The method of claim 1, wherein the OPRF is a verifiable OPRF and wherein the context service system stores a private key for the verifiable OPRF that corresponds to a public key stored by the subscriber.

8. The method of claim 1, wherein the shared data partition stores the contextual information of the subscriber and another contextual information of one of the other subscribers together as one associated data record, and wherein the contextual information is further stored in the subscriber data partition of the context service system and wherein the lookup request is an association request for the at least one second element of the data record that stores the contextual information of a customer and that includes a plurality of elements stored, in association with each other in the shared data partition, as the first blinded attribute and a plurality of second blinded attributes obtained from different subscribers.

9. A method comprising:
obtaining, by a context service system from a subscriber, a request including at least one element of a data record, the context service system stores contextual information of the subscriber in a form of attributes that are sharable with other subscribers;
generating, by the context service system, a response by applying an oblivious pseudo random function (OPRF) to the at least one element; and
providing, by the context service system to the subscriber, the response which is applied by the subscriber to compute at least one blinded attribute corresponding to the at least one element and sharable with the other subscribers to obtain an association between the at least one element and at least one other element of the data record, wherein a shared data partition stores the at least one blinded attribute obtained from the data record in a data partition of the subscriber in association with at least one other blinded attribute obtained from at least one other data partition of the other subscribers.

10. The method of claim 9, further comprising:
storing, in a hardware security module of the context service system, a private key; and
generating the response based on the private key.

11. The method of claim 9, wherein the OPRF is a verifiable OPRF.

12. The method of claim 9, wherein:
the at least one element of the data record includes a first element of the data record and a second element of the data record, the first element and the second element include customer information of a customer data record of the subscriber, and
the at least one blinded attribute includes a first blinded attribute corresponding to the first element and a second blinded attribute corresponding to the second element.

13. The method of claim 12, further comprising:
storing, in the shared data partition by the context service system, the first blinded attribute associated with the second blinded attribute; and
storing, in the data partition of the subscriber, by the context service system, the first element with the first blinded attribute and the second element with the second blinded attribute.

14. The method of claim 9, further comprising:
obtaining, by the context service system from the subscriber, a lookup request including the at least one blinded attribute which is a first blinded attribute;
based on the lookup request, identifying by the context service system, at least one second blinded attribute stored in the same data record of the shared data partition as the first blinded attribute; and
providing, by the context service system to the subscriber, the at least one other element of the data record that corresponds to the at least one second blinded attribute such that the subscriber obtains the at least one other element from a subscriber partition storage based on the at least one second blinded attribute.

15. The method of claim 14, wherein the request includes a first address information identifying a blinder processor, wherein the lookup request includes a second address information identifying a context engine of the context service system, and wherein the second address information is different from the first address information.

16. An apparatus comprising:
a communication interface configured to enable network communications on a network;
a memory configured to store executable instructions; and
a processor coupled to the communication interface and the memory and configured to:
obtain, via the communication interface, from a subscriber, a lookup request including a first blinded attribute, the first blinded attribute obtained by applying an oblivious pseudo random function (OPRF) to a first element of a data record;
identify at least one second blinded attribute associated with the first blinded attribute in a shared data partition of a storage system that stores contextual information of the subscriber in a form of attributes that are sharable with other subscribers, wherein the shared data partition includes the first blinded attribute obtained from a first subscriber data partition of the subscriber and the at least one second blinded attribute obtained from at least one second subscriber data partition of the other subscribers; and
provide at least one second element of the data record associated with the at least one second blinded attribute.

17. The apparatus of claim 16, wherein the processor is further configured to:
identify, in the at least one second subscriber data partition of the storage system, the at least one second element of the data record associated with the first element based on the at least one second blinded attribute, wherein the at least one second subscriber data partition is associated with the at least one second subscriber data partition.

18. The apparatus of claim 17, wherein the processor is further configured to:
store, in the data record of the first subscriber data partition, the first element in association with the at least one second element, the data record including the first element and the at least one second element which are encrypted information of a customer record of the subscriber.

19. The apparatus of claim 17, wherein the first element of the data record and the at least one second element of the data record are customer information stored in association with each other forming a customer record.

20. The apparatus of claim 16, wherein the processor is further configured to:
communicate with one or more of the other subscribers to obtain the at least one second blinded attribute which includes a plurality of second blinded attributes; and
store the first blinded attribute and the plurality of second blinded attributes, as the data record in the shared data partition, the data record relating to a single customer of the subscriber.

* * * * *